(12) United States Patent
Dynarski et al.

(10) Patent No.: US 8,464,272 B2
(45) Date of Patent: Jun. 11, 2013

(54) INTER-PROCESS COMMUNICATION METHODS AND APPARATUS FOR BUILDING SCALABLE/REDUNDANT TELECOMMUNICATIONS SYSTEMS

(75) Inventors: Richard J. Dynarski, Freehold, NJ (US); James Kelleman, Easton, PA (US); David R. Mazik, Howell, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1362 days.

(21) Appl. No.: 12/112,961

(22) Filed: Apr. 30, 2008

(65) Prior Publication Data

US 2008/0276249 A1     Nov. 6, 2008

Related U.S. Application Data

(60) Provisional application No. 60/916,247, filed on May 4, 2007.

(51) Int. Cl.
  *G06F 3/00* (2006.01)
  *G06F 9/44* (2006.01)
  *G06F 9/46* (2006.01)
  *G06F 13/00* (2006.01)

(52) U.S. Cl.
  USPC ........................... 719/313; 719/310; 719/318

(58) Field of Classification Search
  None
  See application file for complete search history.

(56) References Cited

U.S. PATENT DOCUMENTS

| | | | |
|---|---|---|---|
| 5,742,778 A | | 4/1998 | Hao et al. |
| 6,122,671 A * | | 9/2000 | Farrar et al. ............ 709/238 |
| 6,430,698 B1 * | | 8/2002 | Khalil et al. ............ 714/4.1 |
| 6,721,907 B2 * | | 4/2004 | Earl ........................ 714/57 |
| 6,920,485 B2 | | 7/2005 | Russell |
| 7,080,151 B1 * | | 7/2006 | Borella et al. .......... 709/230 |
| 7,721,907 B2 | | 5/2010 | Keung |
| 2004/0031033 A1 | | 2/2004 | Chandra et al. |
| 2004/0039774 A1 | | 2/2004 | Xu et al. |
| 2004/0264463 A1 * | | 12/2004 | Fukushima et al. ...... 370/390 |
| 2007/0214246 A1 * | | 9/2007 | Venkataswami et al. ... 709/223 |

FOREIGN PATENT DOCUMENTS

| | | |
|---|---|---|
| JP | 199584744 | 3/1995 |
| JP | 199630455 | 2/1996 |
| TW | 589907 B | 6/2004 |
| WO | WO9401832 A1 | 1/1994 |

OTHER PUBLICATIONS

The Transparent Inter-Process Communication (TIPC) Project home page (http://tipc.sourceforge.net/), May 16, 2008.
International Search Report, PCT/US08/062408, International Search Authority, European Patent Office, Oct. 27, 2008.
Written Opinion, PCT/US08/062408, International Search Authority, European Patent Office, Oct. 27, 2008.
Taiwan Search Report—TW097116395—TIPO—Mar. 30, 2012.

\* cited by examiner

*Primary Examiner* — H S Sough
*Assistant Examiner* — Craig Dorais
(74) *Attorney, Agent, or Firm* — Michelle Gallardo

(57) ABSTRACT

A messaging entity within a messaging system may facilitate registration with the messaging system by software components. The messaging entity may facilitate unicast communication between registered software components. The messaging entity may facilitate registration for multicast events by software components. The messaging entity may facilitate multicast communication between registered software components.

15 Claims, 12 Drawing Sheets

INTER-PROCESS COMMUNICATION METHODS AND APPARATUS FOR BUILDING SCALABLE/REDUNDANT TELECOMMUNICATIONS SYSTEMS

CLAIM OF PRIORITY UNDER 35 U.S.C §119

The present application for patent claims priority to U.S. Provisional Application No. 60/916,247, filed on May 4, 2007 and is assigned to the assignee hereof and expressly incorporated by reference herein.

TECHNICAL FIELD

The present disclosure relates generally to telecommunications systems. More specifically, the present disclosure relates to inter-process communication methods and apparatus for building scalable/redundant telecommunications systems.

BACKGROUND

When building distributed and redundant telecommunication systems, some sort of messaging layer is used to provide for inter-process (or thread) communication. This allows the distributed software finite state machines to communicate in order to provide a service.

Typical messaging systems provide a way of sending point-to-point messages between components. The ability to multicast or broadcast messages is sometimes provided, but not always.

Many inter-process communication schemes are also operating system and/or backplane specific. This makes porting their services difficult and impacts the overall software architecture of the system because messaging is normally a fundamental service upon which all other software is written.

Many other systems provide services like name resolution, network time distribution, and distributed heartbeat layering on top of messaging as another application. This also leads to inefficiencies in processing.

BRIEF SUMMARY OF THE INVENTION

An apparatus for inter-process communication is disclosed. The apparatus may be used as a messaging entity in a messaging system. The apparatus may include a processor and circuitry coupled to said processor. The circuitry may be configured to facilitate registration with the messaging system by software components, facilitate unicast communication between registered software components, facilitate registration for multicast events by software components, and facilitate multicast communication between registered software components.

An apparatus for inter-process communication is disclosed. The apparatus may be used as a messaging server in a messaging system. The apparatus may include a processor and circuitry coupled to said processor. The circuitry may be configured to discover new messaging clients within the distributed computing system, verify that registered messaging clients are operational, maintain synchronization among the registered messaging clients, manage a master version of a resource location cache, and manage a master version of a multicast registration data structure.

A method for inter-process communication that may be performed by a messaging entity within a messaging system is disclosed. The method may include facilitating registration with the messaging system by software components. The method may also include facilitating unicast communication between registered software components. The method may also include facilitating registration for multicast events by software components. The method may also include facilitating multicast communication between registered software components.

A method for inter-process communication that may be performed by a messaging server within a messaging system is disclosed. The method may include discovering new messaging clients within the distributed computing system. The method may also include verifying that registered messaging clients are operational. The method may also include maintaining synchronization among the registered messaging clients. The method may also include managing a master version of a resource location cache. The method may also include managing a master version of a multicast registration data structure.

A hardware unit comprising a messaging entity that is configured to facilitate inter-process communication between software components in a distributed computing system is disclosed. The messaging entity may include a registration component that is configured to facilitate registration with the messaging system by software components. The messaging entity may also include a resource location server that is configured to facilitate unicast communication between registered software components. The messaging entity may also include a multicast registration component that is configured to facilitate registration for multicast events by software components. The messaging entity may also include a multicast communication component that is configured to facilitate multicast communication between registered software components.

A hardware unit comprising a messaging server that is configured to facilitate inter-process communication between software components in a distributed computing system is also disclosed. The messaging server may include a client discovery component that is configured to discover new messaging clients within the distributed computing system. The messaging server may also include a verification component that is configured to verify that registered messaging clients are operational. The messaging server may also include a synchronization component that is configured to maintain synchronization among the registered messaging clients. The messaging server may also include a cache manager that is configured to manage a master version of a resource location cache. The messaging server may also include a multicast registration manager that is configured to manage a master version of a multicast registration data structure.

An apparatus comprising a messaging entity that is configured to facilitate inter-process communication between software components in a distributed computing system is also disclosed. The messaging entity may include means for facilitating registration with the messaging system by software components. The messaging entity may also include means for facilitating unicast communication between registered software components. The messaging entity may also include means for facilitating registration for multicast events by software components. The messaging entity may also include means for facilitating multicast communication between registered software components.

An apparatus comprising a messaging server that is configured to facilitate inter-process communication between software components in a distributed computing system is also disclosed. The apparatus may include means for discovering new messaging clients within the distributed computing system. The apparatus may also include means for verifying that registered messaging clients are operational. The apparatus may also include means for maintaining synchronization among the registered messaging clients. The apparatus may also include means for managing a master version of a resource location cache. The apparatus may also include means for managing a master version of a multicast registration data structure.

A computer-program product for facilitating inter-process communication between software components in a distributed computing system is also disclosed. The computer-program product may include a computer readable medium having instructions thereon. The instructions may include code for facilitating registration with the messaging system by software components. The instructions may also include code for facilitating unicast communication between registered software components. The instructions may also include code for facilitating registration for multicast events by software components. The instructions may also include code for facilitating multicast communication between registered software components.

A computer-program product for facilitating inter-process communication between software components in a distributed computing system is disclosed. The computer-program product may include a computer readable medium having instructions thereon. The instructions may include code for discovering new messaging clients within the distributed computing system. The instructions may also include code for verifying that registered messaging clients are operational. The instructions may also include code for maintaining synchronization among the registered messaging clients. The instructions may also include code for managing a master version of a resource location cache. The instructions may also include code for managing a master version of a multicast registration data structure.

BRIEF DESCRIPTION OF THE DRAWINGS

FIG. 7A illustrates means-plus-function blocks corresponding to the method of FIG. 7;

FIG. 8A illustrates means-plus-function blocks corresponding to the method of FIG. 8;

DETAILED DESCRIPTION

Figure 1:
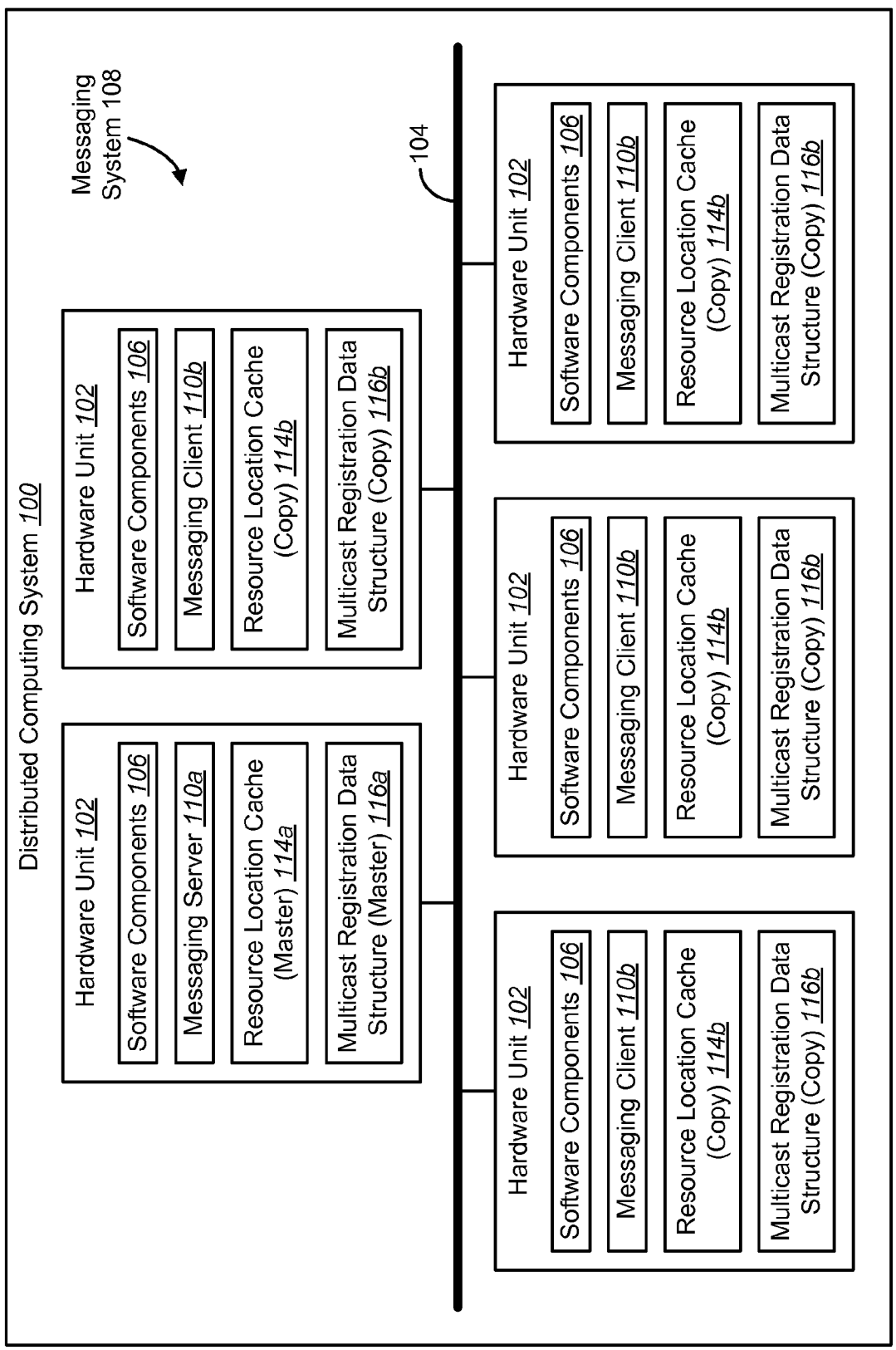
FIG. 1 illustrates an example of a messaging system implemented within a distributed computing system.

The present disclosure relates to a distributed software architecture which provides a messaging layer capable of message unicasting and multicasting (including broadcasting) of messages. The messaging system may be capable of hiding the distributed nature of the system, providing a method for resolving logical names to physical addresses, as well as distributing network time to distributed modules and verifying that the distributed modules are still operational.

An advantage of some aspects described herein is a messaging system which can be ported to many different systems (e.g., *NIX, Sun Solaris, RTOS, DSP) to provide a common layer of software capable of hiding the distributed nature of the system. This provides a flexible software architecture. Named software components can migrate around within the hardware/software architecture without knowledge of any other components.

The messaging system described herein may provide a single unified interface to provide the ability to perform at least one of unicast, multicast, or broadcast messages between software components. Furthermore, at least one of the unicast, multicast, or broadcast messages can be acknowledged. Multicast message recipients may be unknown to the sender. This decouples the sender of a multicast message from a receiver. The decoupling allows a very flexible software architecture to be built which evolves well. Receivers may be free to come and go without any need to modify the sender. This is well-suited to event driven finite state machine software development models.

All, or several, software components in the messaging system may be identified by logical names. The system-wide location of a logical name may be constructed at run time as the software components register with the messaging system. The registration may cause a new entry to be entered into a name cache. As new entries are added into the name cache they may also be broadcasted out to all hardware entities capable of running the messaging software. Each time the cache is modified a sequence number may be incremented to represent the current level of the cache. This sequence number may be used in a heartbeat operation to make sure that all hardware entities have a consistent name cache. For the sake of efficiency, a name cache update can be either full or incremental. The messaging system may be configured to try for an incremental update unless the requestor is so out of date that a full update would be faster.

All messages sent to a particular component may utilize the component's logical name. The messaging system itself may translate the logical name to a physical location as the message is being processed for sending. This feature hides the distributed nature of the system and allows components to be moved within the system without impacting any software.

When being used on a distributed hardware architecture, the messaging layer may also provide a "heartbeat" mechanism to make sure that all required components are responding. The heartbeat message may include the master network time, as well as an integral number representing the name cache. The network time may be used to time synchronize all entities in the system. The name cache sequence number may be used to determine whether or not each of the slave caches is up to date. Caches determined to be out of date may request a full or incremental update to resynchronize them with the master.

The messaging layer may also be configurable to allow it to be used on a single operating system type of environment (like Sun Solaris based servers) or within a distributed multi-CPU environment typical of telecommunications equipment. This ability allows software written in one environment to be used in a different environment with only a recompilation. This ability gives the software built above the messaging layer a very high level of portability.

FIG. 1 illustrates a distributed computing system 100. The distributed computing system 100 includes multiple hardware units 102 that are in electronic communication with one another via a communication bus 104. The hardware units 102 may be utilized in telecommunications and data communications devices. For example, the hardware units 102 may be the various processing modules or boards that are contained in routers, switches, base stations, etc. The hardware units 102 include various software components 106 that work together to perform one or more tasks.

A messaging system 108 is implemented within the distributed computing system 100. The messaging system 108 includes a messaging server 110a and one or more messaging clients 110b. The term "messaging entity" 110 may be used herein to refer to either a messaging server 110a or a messaging client 110b.

The messaging system 108 allows the software components 106 within the distributed computing system 100 to communicate with one another. The software components 106 may be finite state machines, and the purpose of the messaging system 108 may be to keep the communicating finite state machines in synchronization.

Communication between the software components 106 may be unicast, multicast, or broadcast. Advantageously, the messaging system 108 is capable of hiding the distributed nature of the distributed computing system 100. Software components 106 within the distributed computing system 100 may be identified by logical names instead of physical addresses. Thus, the software components 106 may be able to communicate with one another regardless of their respective locations within the topology of the distributed computing system 100.

The messaging server 110a manages a master version of a resource location cache 114a and a master version of a multicast registration data structure 116a. Each of the messaging clients 110b work with a local copy of the resource location cache 114b and a local copy of the multicast registration data structure 116b.

Each messaging entity 110 (i.e., either a messaging server 110a or a messaging client 110b) may be configured to allow software components 106 within the distributed computing system 100 to register with the messaging system 108. Each messaging entity 110 may also facilitate communication between registered software components 106.

In addition to performing these functions, the messaging server 110a may also be configured to discover new messaging clients 110b within the distributed computing system 100. The messaging server 110a may also verify that registered messaging clients 110b are operational. The messaging server 110a may also maintain synchronization among the registered messaging clients 110b. The messaging server 110a may also manage the master version of the resource location cache 114a and the master version of the multicast registration data structure 116a.

Figure 2:
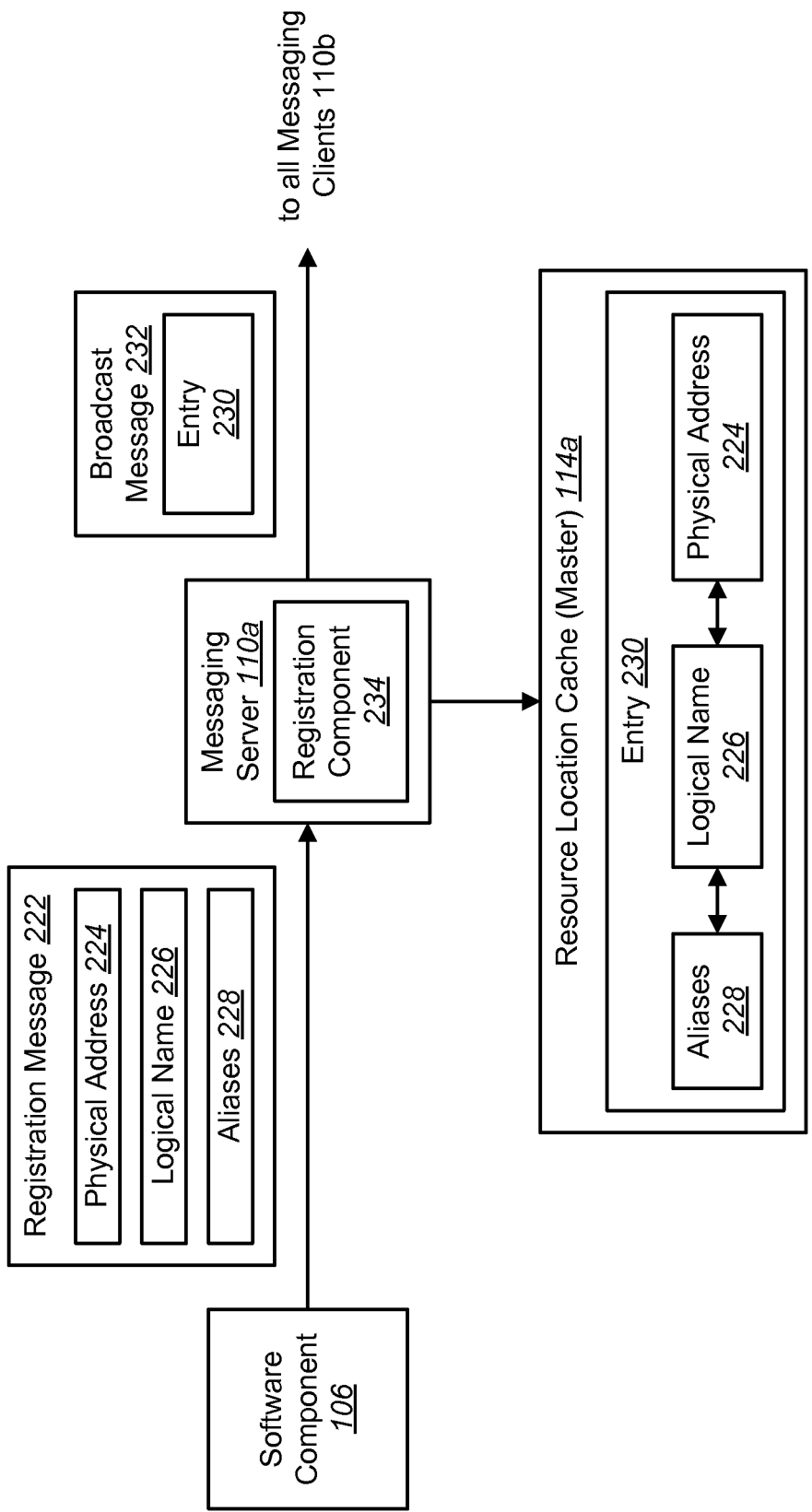
FIG. 2 illustrates an example showing how a software component may register with the messaging system.

FIG. 2 illustrates an example showing how a software component 106 may register with the messaging system 108. A software component 106 may send a registration message 222 to a messaging server 110a. The registration message 222 may include the physical address 224 of the software component 106. The registration message 222 may also include a logical name 226 for the software component 106. The registration message 222 may also include one or more aliases 228 for the logical name 226.

In response to receiving the registration message 222, the messaging server 110a may create an entry 230 for the software component 106 in the master version of the resource location cache 114a. The entry 230 may associate the physical address 224 of the software component 106, the logical name 226 of the software component 106, and the aliases 228 for the logical name 226.

The messaging server 110a may also send a broadcast message 232 to all messaging clients 110b within the messaging system 108. The broadcast message 232 may include the entry 230 that was added to the master version of the resource location cache 114a. In response to receiving the broadcast message 232, each messaging client 110b may update its local copy of the resource location cache 114b to include the entry 230 that has been added to the master version of the resource location cache 114a.

The messaging server 110a is shown with a registration component 234. The registration component 234 may be configured to facilitate registration with the messaging system 108 by software components 106. More specifically, the registration component 234 may be configured to process the registration message 222, add the appropriate entry 230 to the master version of the resource location cache 114a, and send a broadcast message 232 with the entry 230 to all messaging clients 110b within the messaging system 108.

In the example of FIG. 2, the software component 106 sends the registration message 222 to the messaging server 110a. Alternatively, the software component 106 may send the registration message 222 to a messaging client 110b, and the messaging client 110b may forward the pertinent information (e.g., the physical address 224, the logical name 226, and the aliases 228) to the messaging server 110a.

Figure 3:
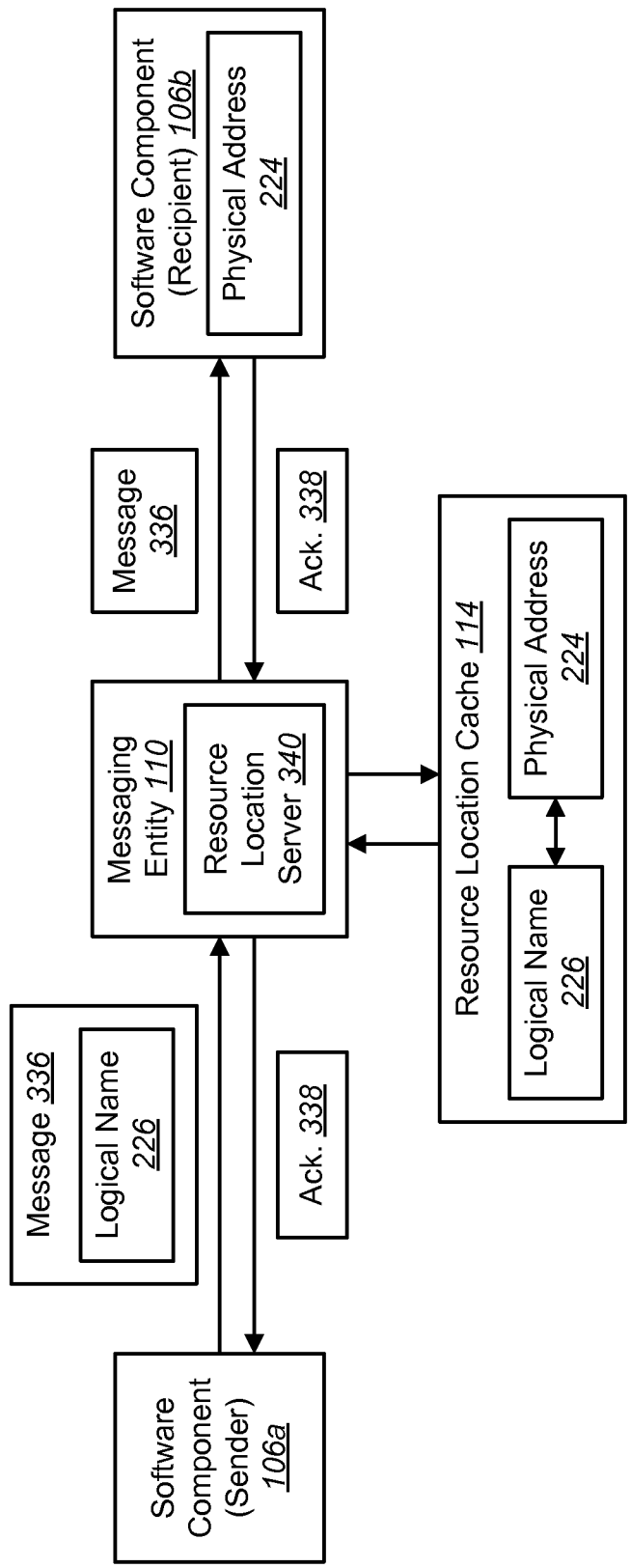
FIG. 3 illustrates an example showing how a messaging entity may facilitate unicast communication between registered software components.

FIG. 3 illustrates an example showing how a messaging entity 110 (i.e., either a messaging server 110a or a messaging client 110b) may facilitate unicast communication between registered software components 106. In this example, it will be assumed that a software component 106a within the messaging system 108 sends a message 336 that is ultimately received by another software component 106b within the messaging system 108. However, the sender software component 106a does not need to know the physical address 224 of the recipient software component 106b. Instead, the destination of the message 336 that is sent by the sender software component 106a is identified by the logical name 226 of the software component 106b.

Upon receiving the message 336 from the sender software component 106a, the messaging entity 110 resolves the logical name 226 of the recipient software component 106b to the physical address 224 of the recipient software component 106b. This may be accomplished by referring to the resource location cache 114 (either the master version of the resource location cache 114a if the messaging entity 110 is a messaging server 110a, or a local copy of the resource location cache 114b if the messaging entity 110 is a messaging client 110b). The messaging entity 110 may then forward the message 336 to the recipient software component 106b.

The messaging entity 110 is shown with a resource location server 340. The resource location server 340 may be configured to facilitate unicast communication between registered software components 106. More specifically, the resource location server 340 may be configured to process the message 336 from the sender software component 106a, resolve the logical name 226 of the recipient software component 106b to the physical address 224 of the recipient software component 106b, and forward the message 336 to the recipient software component 106b.

The recipient software component 106b may acknowledge receipt of the message 336. The recipient software component 106b may send an acknowledgement message 338 back to the messaging entity 110. The messaging entity 110 may forward the acknowledgement message 338 to the sender software component 106*a*.

Figure 4:
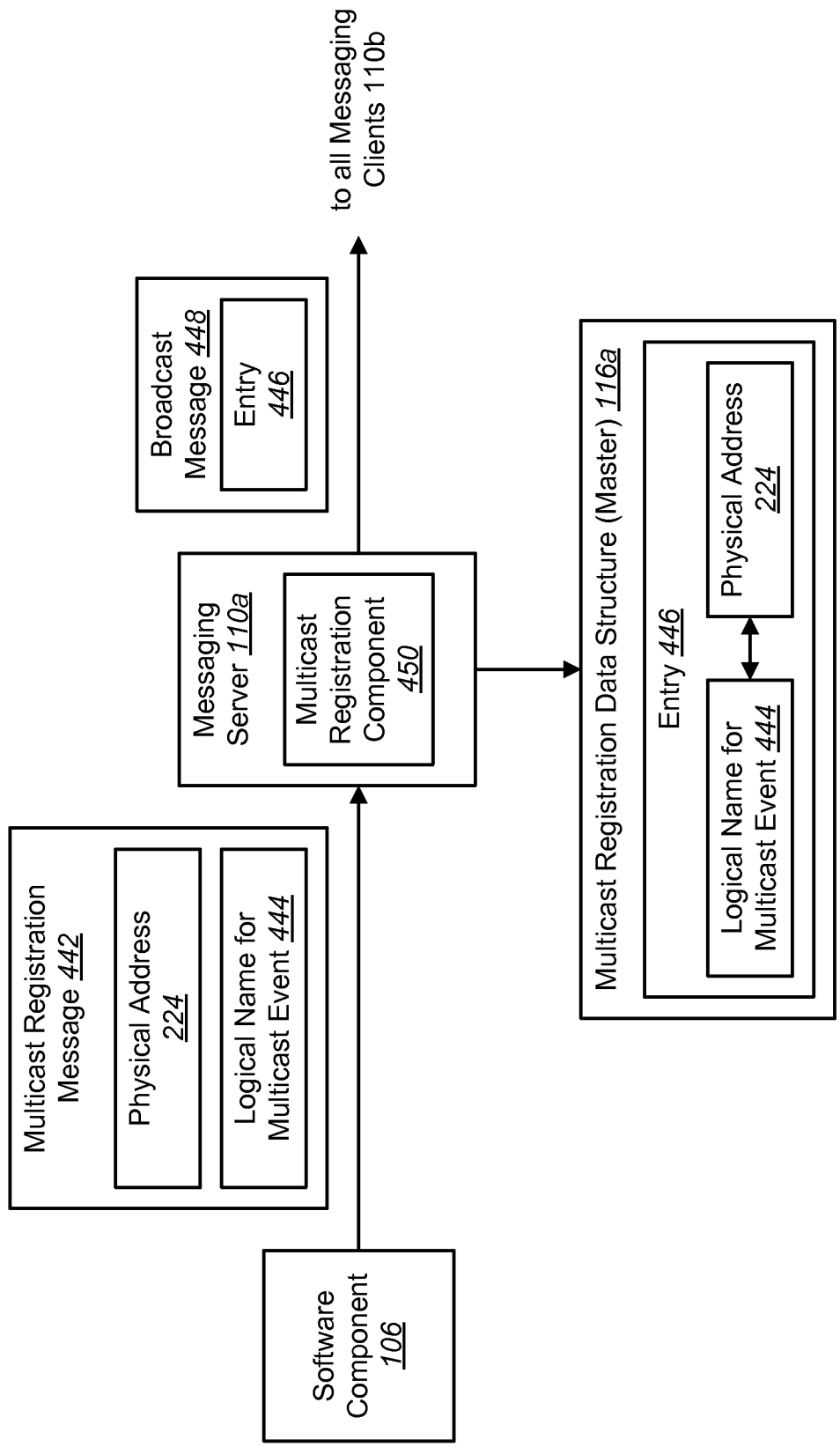
FIG. 4 illustrates an example showing how a software component may register for a multicast event.

The messaging system 108 may facilitate multicast communication between the software components 106 in the distributed computing system 100. FIG. 4 illustrates an example showing how a software component 106 may register for a multicast event.

A software component 106 may send a multicast registration message 442 to a messaging server 110*a*. The multicast registration message 442 may include the physical address 224 of the software component 106. The multicast registration message 442 may also include the logical name 444 of the multicast event for which the software component 106 is registering.

In response to receiving the multicast registration message 442, the messaging server 110*a* may create an entry 446 for the software component 106 in the master version of the multicast registration data structure 116*a*. The entry 446 may associate the physical address 224 of the software component 106 and the logical name 444 of the multicast event for which the software component 106 is registering.

The messaging server 110*a* may also send a broadcast message 448 to all messaging clients 110*b* within the messaging system 108. The broadcast message 448 may include the entry 446 that was added to the master version of the multicast registration data structure 116*a*. In response to receiving the broadcast message 448, each messaging client 110*b* may update its local copy of the multicast registration data structure 116*a* to include the entry 446 that has been added to the master version of the multicast registration data structure 116*a*.

The messaging server 110*a* is shown with a multicast registration component 450. The multicast registration component 450 may be configured to facilitate registration for multicast events by software components 106. More specifically, the multicast registration component 450 may be configured to process the multicast registration message 442, add the appropriate entry 446 to the master version of the multicast registration data structure 116*a*, and send a broadcast message 448 with the entry 446 to all messaging clients 110*b* within the messaging system 108.

In the example of FIG. 4, the software component 106 sends the multicast registration message 442 to the messaging server 110*a*. Alternatively, the software component 106 may send the multicast registration message 442 to a messaging client 110*b*, and the messaging client 110*b* may forward the pertinent information (e.g., the physical address 224 of the software component 106 and the logical name 444 of the multicast event for which the software component 106 is registering) to the messaging server 110*a*.

Figure 5:
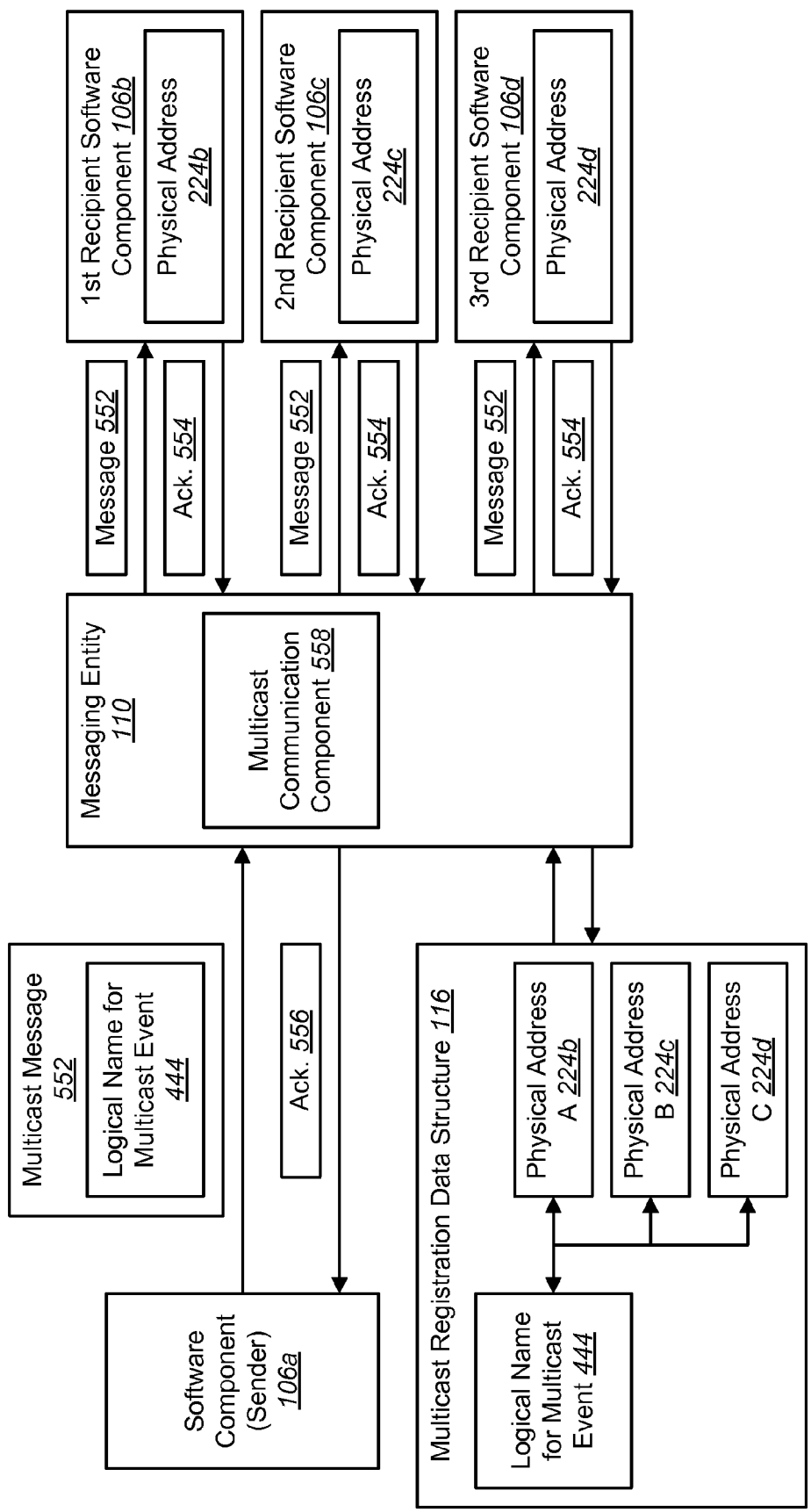
FIG. 5 illustrates an example showing how a messaging entity may facilitate multicast communication between registered software components.

FIG. 5 illustrates an example showing how a messaging entity 110 (i.e., either a messaging server 110*a* or a messaging client 110*b*) may facilitate multicast communication between registered software components 106. In this example, it will be assumed that a software component 106*a* within the messaging system 108 sends a multicast message 552 that is ultimately received by multiple software components 106*b-d* within the messaging system 108. However, the sender software component 106*a* does not need to know the physical addresses 224*b-d* of the recipient software components 106*b-d*. Instead, the destination of the multicast message 552 that is sent by the sender software component 106*a* is identified by the logical name 444 for the multicast event.

Upon receiving the multicast message 552 from the sender software component 106*a*, the messaging entity 110 identifies the physical addresses 224*b-d* of the software components 106*b-d* that have registered for the multicast event. This may be accomplished by referring to the multicast registration data structure 116. The messaging entity 110 may then forward the multicast message 552 to the recipient software components 106*b-d*.

Each of the recipient software components 106*b-d* may respond to the multicast message 552 by sending an acknowledgement message 554 back to the messaging entity 110. After all of the software components 106*b-d* that are intended to receive the multicast message 552 have responded with an acknowledgement message 554, then the messaging entity 110 may send a single acknowledgement message 556 back to the sender software component 106*a*.

The messaging entity 110 is shown with a multicast communication component 558. The multicast communication component 558 may be configured to facilitate multicast communication between registered software components 106. More specifically, the multicast communication component 558 may be configured to process the multicast message 552 that is received from the sender software component 106*a*, identify the physical addresses 224*b-d* of the software components 106*b-d* that have registered for the multicast event, and forward the multicast message 552 to these physical addresses 224*b-d*. The multicast communication component 558 may also be configured to process the acknowledgement messages 554 that are received from the recipient software components 106*b-d*, and send a single acknowledgement message 556 back to the sender software component 106*a*.

Figure 6:
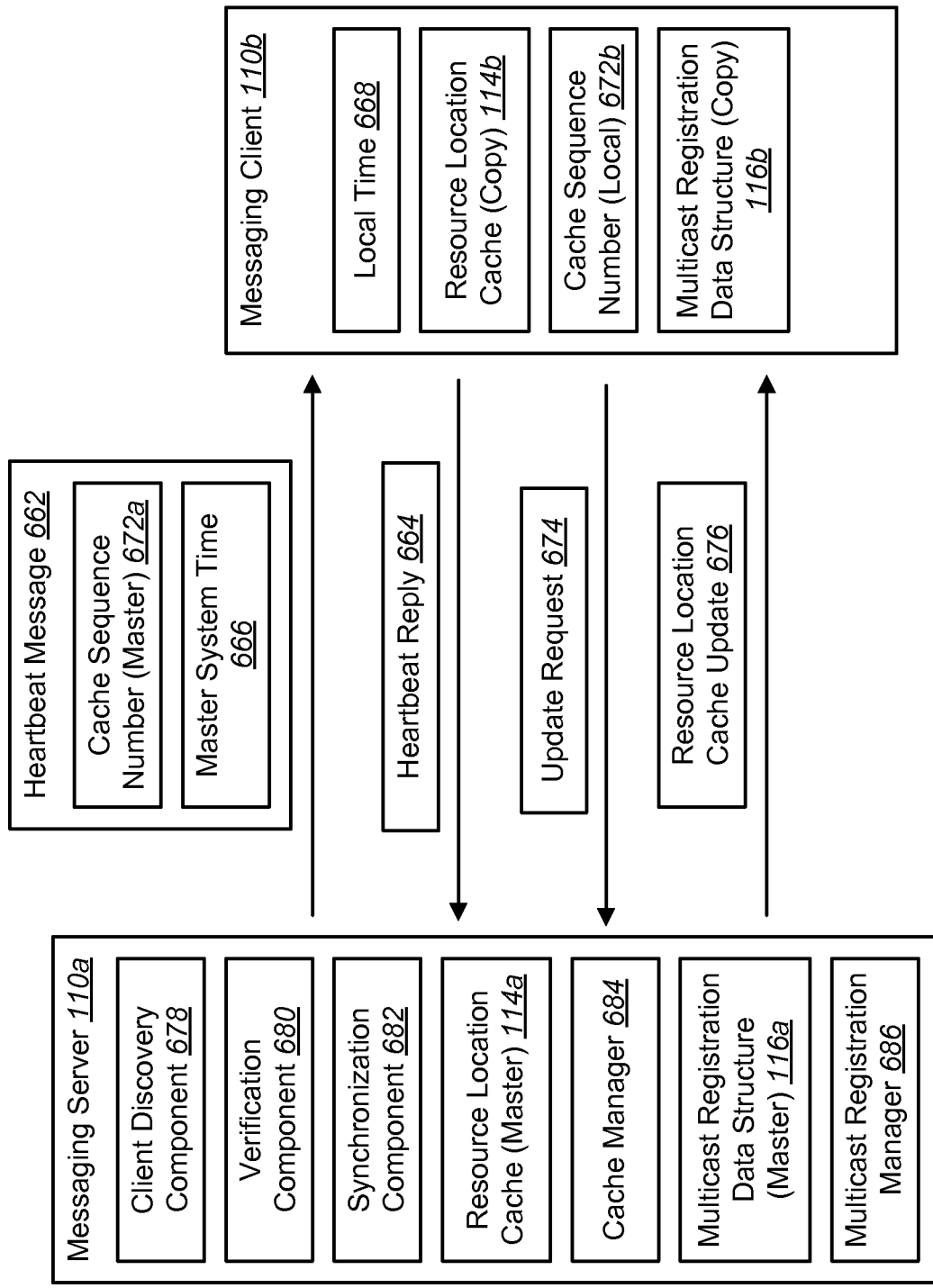
FIG. 6 illustrates some of the functions that may be performed by a messaging server.

FIG. 6 illustrates some of the functions that may be performed by a messaging server 110*a*. The messaging server 110*a* is shown with a verification component 680. The verification component 680 may be configured to verify that registered messaging clients 110*b* are operational.

The messaging server 110*a* may periodically send a heartbeat message 662 to all messaging clients 110*b* in the messaging system 108. All registered messaging clients 110*b* may be configured to respond to each heartbeat message 662 that is received by sending a heartbeat reply 664 to the messaging server 110*a*. As long as a particular messaging client 110*a* continues to respond to the heartbeat messages 662 that are sent, then the messaging server 110*a* may conclude that the messaging client 110*b* is still operational. However, if a particular messaging client 110*b* fails to respond to a certain number of consecutive heartbeat messages 662 (e.g., three consecutive heartbeat messages 662), the messaging server 110*a* may conclude that the messaging client 110*b* is no longer operational.

The messaging server 110*a* is also shown with a synchronization component 682. The synchronization component 682 may be configured to maintain synchronization among the registered messaging clients 110*b*. In order to maintain synchronization among the registered messaging clients 110*b*, the heartbeat messages 662 that are sent by the messaging server 110*a* may include the master time 666 for the messaging system 108. Each messaging client 110*b* may update its local time 668 based on the master time 666 that is received in the heartbeat messages 662 (i.e., so that the local time 668 is the same as the master time 666).

The messaging server 110*a* is also shown with a cache manager 684. The cache manager 684 may be configured to manage the master version of the resource location cache 114*a*. The cache manager 684 may be configured to notify messaging clients 110*b* within the messaging system 108 whenever changes are made to the resource location cache 114*a*. Each messaging client 110*b* may then update its local copy of the resource location cache 114*b*.

The heartbeat messages 662 that are sent by the messaging server 110a may include a cache sequence number 672a. The cache sequence number 672a may be used by the messaging clients 110b to ensure that the local copy of the resource location cache 114b is up-to-date relative to the master version of the resource location cache 114a.

Whenever the master version of the resource location cache 114a is updated, the messaging server 110a may increment the cache sequence number 672a. Each messaging client 110b may compare the local cache sequence number 672b with the master cache sequence number 672a that is included in the heartbeat messages 662. If the local cache sequence number 672b matches the master cache sequence number 672a, then the messaging client 110b may conclude that the local copy of the resource location cache 114b is up-to-date. However, if the local cache sequence number 672b does not match the master cache sequence number 672a, then the messaging client 110b may conclude that the local copy of the resource location cache 614b is out of date. The messaging client 110b may then send an update request 674 to the messaging server 110a.

Upon receiving an update request 674 from a messaging client 110b, the messaging server 110a may send a resource location cache update 676 to the messaging client 110b. The resource location cache update 676 may be a complete update, i.e., a copy of the entire master version of the resource location cache 114a may be transmitted to the messaging client 110b. Alternatively, the resource location cache update 676 may be an incremental update, i.e., only the changes to the cache 114a that have occurred since the last time that the local cache 114b was updated may be transmitted.

The messaging server 110a is also shown with a client discovery component 678. The client discovery component 678 may be configured to discover new messaging clients 110b within the distributed computing system 100. By sending heartbeat messages 662 to all messaging clients 110b in the distributed computing system 100, new messaging clients 110b are able to determine the identity of the messaging server 110a. The new messaging clients 110b may then contact the messaging server 110a about registering with the messaging system 108 (e.g., by sending a reply 664 to the messaging server 110a).

The messaging server 110a is also shown with a multicast registration manager 686. The multicast registration manager 686 may be configured to manage a master version of a multicast registration data structure 116a. The multicast registration manager 686 may be configured to notify messaging clients 110b within the messaging system 108 whenever changes are made to the multicast registration data structure 116a. Each messaging client 110b may then update its local copy of the multicast registration data structure 116b.

Figure 7:
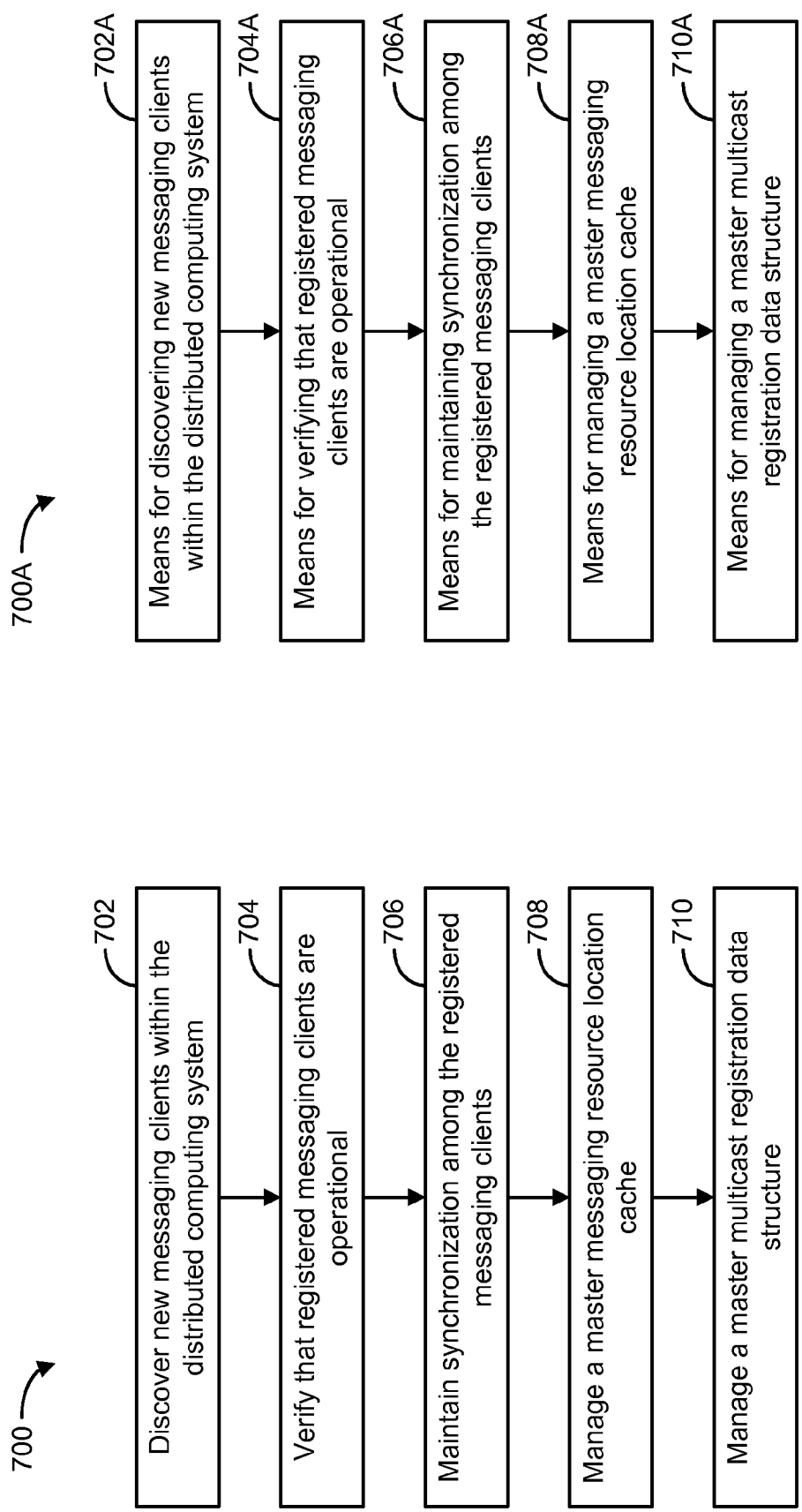
FIG. 7 illustrates an example of a method for inter-process communication that may be performed by a messaging server.

FIG. 7 illustrates an example of a method 700 for inter-process communication that may be performed by a messaging server 110a within a messaging system 108 that is implemented within a distributed computing system 100.

In accordance with the depicted method 700, the messaging server 110a may discover 702 new messaging clients 110b within the distributed computing system 100. This may be accomplished by sending heartbeat messages 662 to all messaging clients 110b in the distributed computing system 100. Upon receiving the heartbeat messages 662, new messaging clients 110b are able to determine the identity of the messaging server 110a. The new messaging clients 110b may then contact the messaging server 110a about registering with the messaging system 108.

The messaging server 110a may also verify 704 that registered messaging clients 110b are operational. This may be accomplished by periodically sending heartbeat messages 662 to all messaging clients 110b in the distributed computing system 100. All registered messaging clients 110b may be configured to respond to each heartbeat message 662 that is received by sending a reply 664 to the messaging server 110a. As long as a particular messaging client 110a continues to respond to the heartbeat messages 662 that are sent, then the messaging server 110a may conclude that the messaging client 110b is still operational. However, if a particular messaging client 110b fails to respond to a certain number of consecutive heartbeat messages 662 (e.g., three consecutive heartbeat messages 662), the messaging server 110a may conclude that the messaging client 110b is no longer operational.

The messaging server 110a may also maintain 706 synchronization among the registered messaging clients 110b. The heartbeat messages 662 that are sent by the messaging server 110a may include the master time 666 for the messaging system 108. Each messaging client 110b may update its local time 668 based on the master time 666 that is received in the heartbeat messages 662.

The messaging server 110a may also manage 708 a master version of a messaging resource location cache 114a. The messaging server 110a may notify messaging clients 110b within the messaging system 108 about changes that are made to the master version of the messaging resource location cache 114a (e.g., when a new software component 106 registers with the messaging system 108).

The messaging server 110a may also manage 710 a master version of a multicast registration data structure 116a. The messaging server 110a may notify messaging clients 110b within the messaging system 108 about changes that are made to the master version of the multicast registration data structure 116a (e.g., when a software component 106 registers for a multicast event).

The method 700 of FIG. 7 described above may be performed by various hardware and/or software component(s) and/or module(s) corresponding to the means-plus-function blocks 700A illustrated in FIG. 7A. In other words, blocks 702 through 710 illustrated in FIG. 7 correspond to means-plus-function blocks 702A through 710A illustrated in FIG. 7A.

Figure 8:
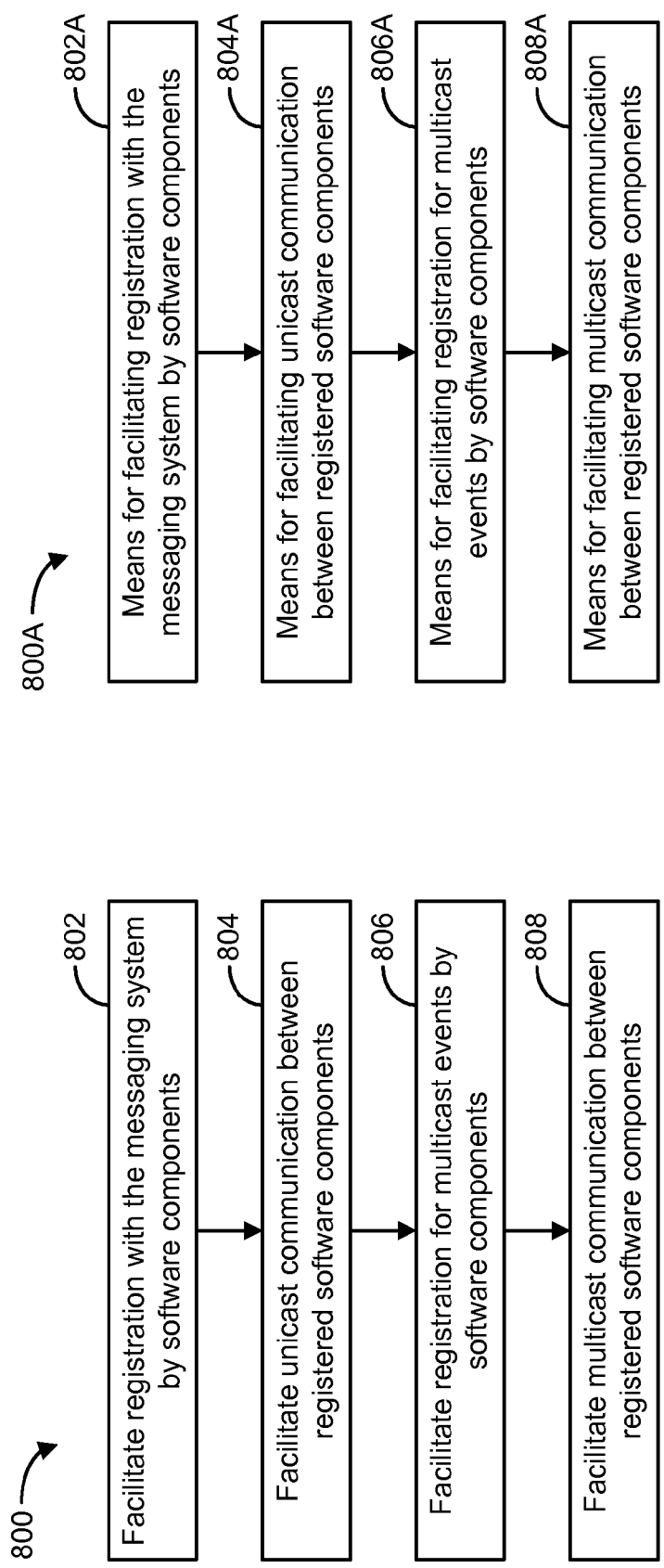
FIG. 8 illustrates an example of a method for inter-process communication that may be performed by a messaging entity.

FIG. 8 illustrates an example of a method 800 for inter-process communication that may be performed by a messaging entity 110 (i.e., either a messaging server 110a or a messaging client 110b) within a messaging system 108 that is implemented within a distributed computing system 100.

In accordance with the depicted method 800, a messaging entity 110 may facilitate 802 registration with the messaging system 108 by software components 106. A software component 106 may send a registration message 222 to a messaging entity 110. In response to receiving the registration message 222, the messaging entity 110 may cause an entry 230 for the software component 106 to be created in the master version of the resource location cache 114a. The entry 230 may associate the physical address 224 of the software component 106, the logical name 226 of the software component 106, and any aliases 228 that exist for the logical name 226. All messaging clients 110b within the messaging system 108 may be notified about the entry 230 that is added to the master version of the resource location cache 114a.

The messaging entity 110 may also facilitate 804 unicast communication between registered software components 106. The messaging entity 110 may receive a message 336 where the destination is identified by the logical name 226 of the recipient software component 106b. The messaging entity 110 may resolve the logical name 226 of the recipient software component 106*b* to the physical address 224 of the recipient software component 106*b*. This may be accomplished by referring to the resource location cache 114. The messaging entity 110 may then forward the message 336 to the physical address 224 of the recipient software component 106*b*.

The messaging entity 110 may also facilitate 806 registration for multicast events by software components 106 within the distributed computing system 100. In response to receiving a multicast registration message 442, the messaging entity 110 may cause an entry 446 for the software component 106 to be created in the master version of the multicast registration data structure 116*a*. The entry 446 may associate the physical address 224 of the software component 106 and the logical name 444 of the multicast event for which the software component 106 is registering.

The messaging entity 110 may also facilitate 808 multicast communication between registered software components 106. Upon receiving a multicast message 552 that includes a logical name 444 for a multicast event, the messaging entity 110 may identify the physical addresses 224*b-d* of the software components 106*b-d* that have registered for the multicast event. This may be accomplished by referring to the multicast registration data structure 116. The messaging entity 110 may then forward the multicast message 552 to the appropriate recipient software components 106*b-d*.

The method 800 of FIG. 8 described above may be performed by various hardware and/or software component(s) and/or module(s) corresponding to the means-plus-function blocks 800A illustrated in FIG. 8A. In other words, blocks 802 through 808 illustrated in FIG. 8 correspond to means-plus-function blocks 802A through 808A illustrated in FIG. 8A.

Figure 9:
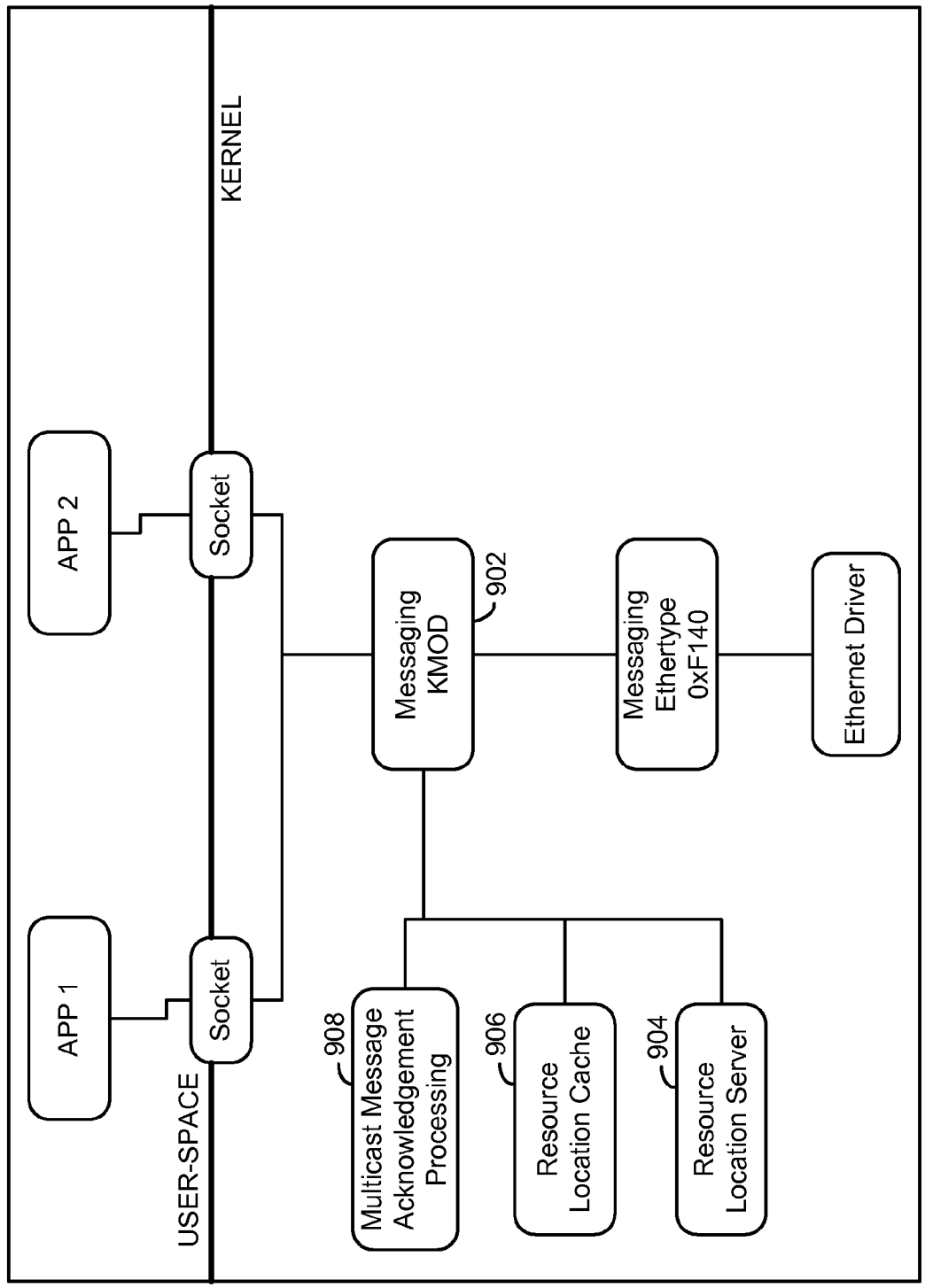
FIGS. 9-11 illustrate several examples showing how the messaging system described herein may be implemented.

FIG. 9 illustrates an example of how the messaging system described herein may be implemented on a UNIX based system. In the depicted example, the messaging system is layered over an Ethernet backplane and the user-kernel interface is implemented using the socket layer. This architecture allows UNIX loadable kernel modules to be a part of the messaging system and blurs the distinction between kernel and user-space components. The messaging system includes a messaging kernel module 902, a resource location server 904, a resource location cache 906, and a multicast message acknowledgement processing component 908.

Figure 10:
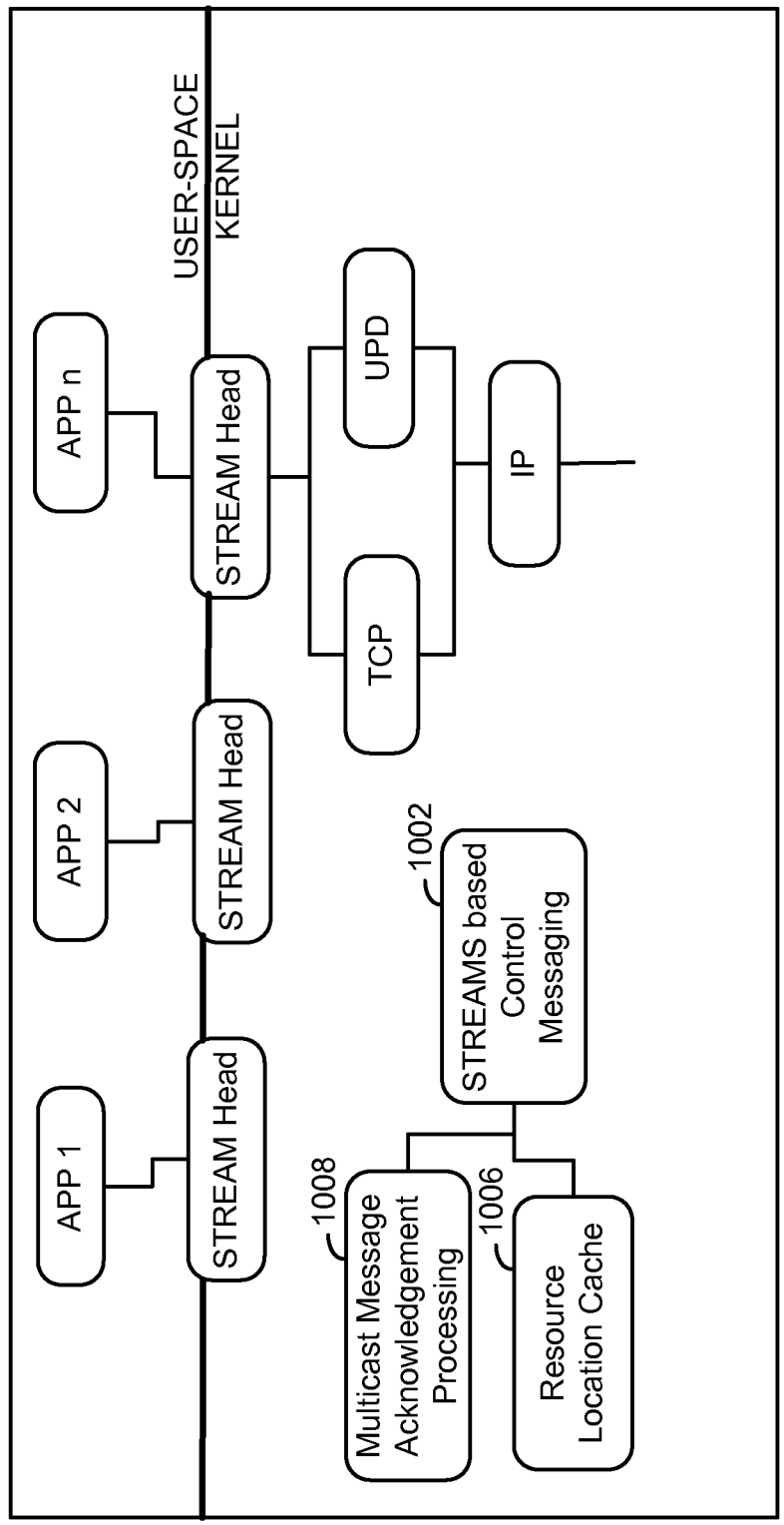

FIG. 10 illustrates an example of how the messaging system described herein may be implemented on a Sun Solaris system. This system may maintain the same messaging interface between components even though it is running on a single OS system. In this architecture, messaging features like heartbeating and local cache maintenance may be automatically disabled. The same software system may run on a Linux-based system if the messaging kernel module is reworked and the user-space software recompiled for Linux. The messaging system includes a control messaging component 1002, a resource location cache 1006, and a multicast message acknowledgement processing component 1008.

Figure 11:
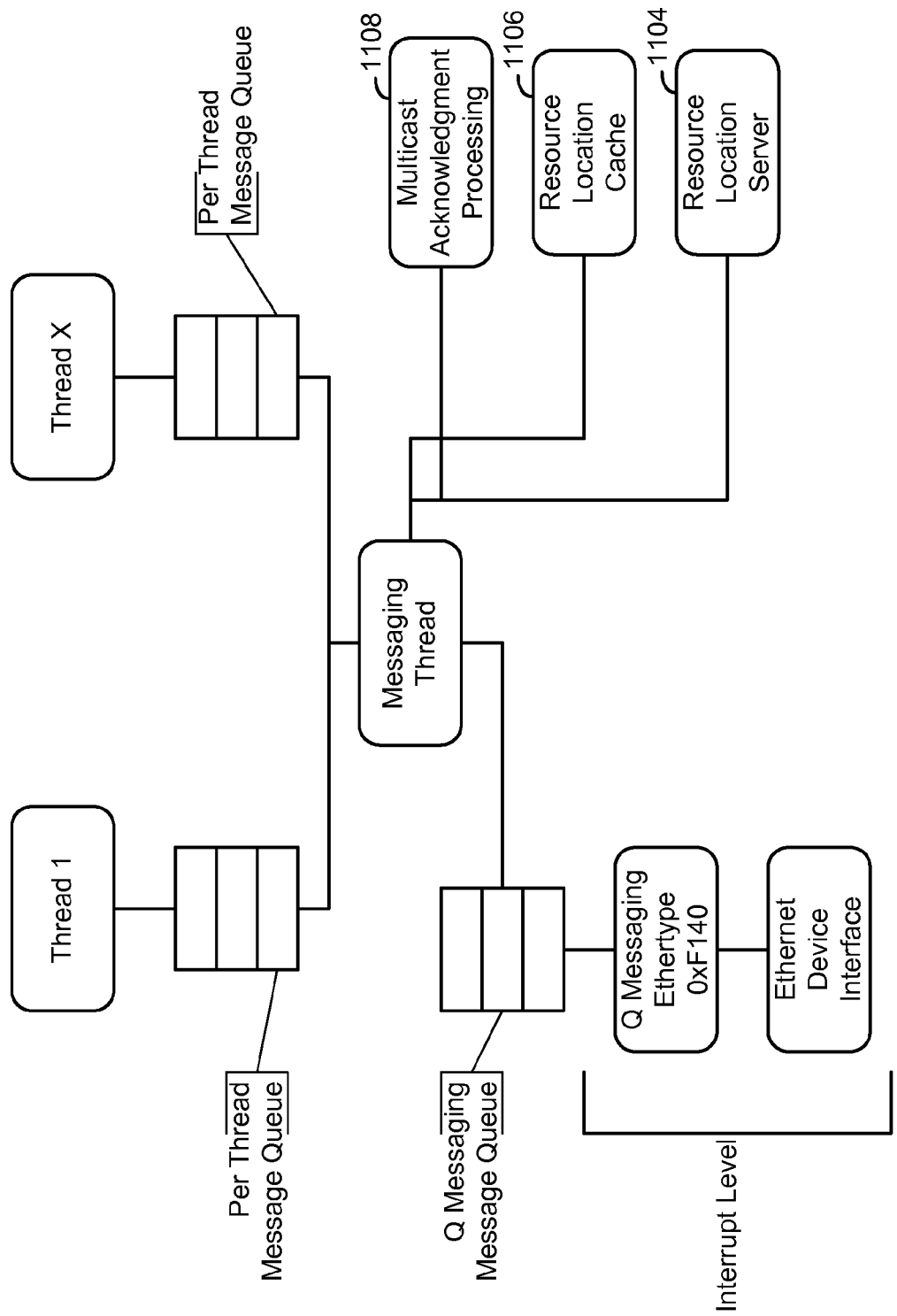

FIG. 11 illustrates an example of how the messaging system described herein may be implemented on a real-time operating system (RTOS). The messaging system includes a resource location server 1104, a resource location cache 1106, and a multicast message acknowledgement processing component 1108.

Redundancy may also be supported within this system because all message destinations may be built and resolved dynamically. This means that when a particular hardware unit fails, the messaging system may unregister those logical names and update any distributed caches. When a replacement is brought online, the new unit may register for the same logical names but with a new physical location. Without any changes to any applications, the new unit may be ready to participate fully in the system. The standby unit can also be kept "hot" by having the standby unit register for certain logical names. This allows the active unit to determine their presence (by being able to resolve the name) and also to send update messages to it to keep the standby unit synchronized. When the standby unit detects the active unit has died, it can register for all of the active unit logical names. This allows both hot and warm redundancy to be implemented.

Figure 12:
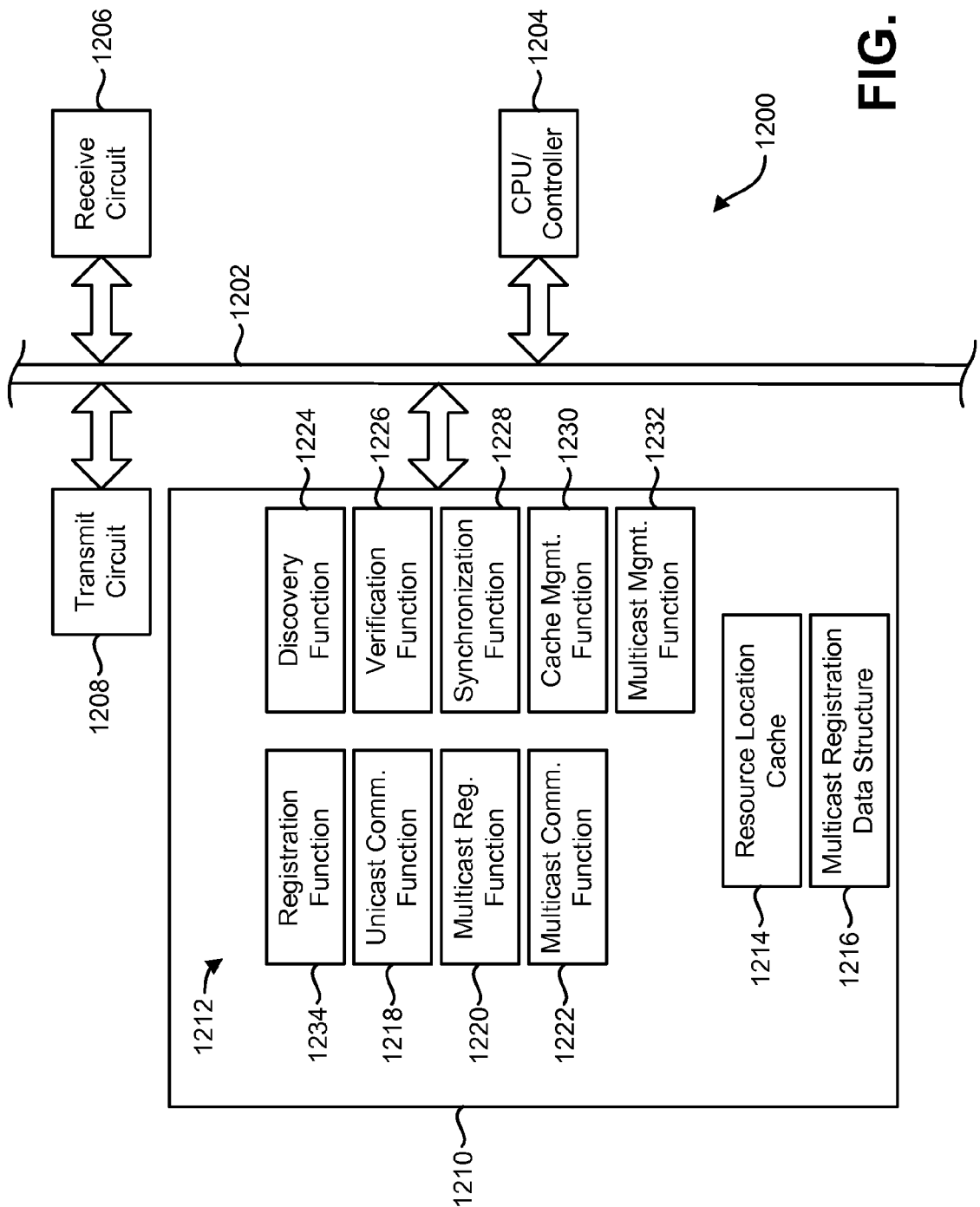
FIG. 12 illustrates part of a hardware implementation of an apparatus for facilitating inter-process communication between software components in a distributed computing system.

FIG. 12 shows part of a hardware implementation of an apparatus for facilitating inter-process communication between software components 106 in a distributed computing system 100 as described above. The circuit apparatus is signified by the reference numeral 1200 and can be implemented in the various processing modules or boards that are contained in routers, switches, base stations, etc.

The apparatus 1200 comprises a central data bus 1202 linking several circuits together. The circuits include a CPU (Central Processing Unit) or a controller 1204, a receive circuit 1206, a transmit circuit 1208, and a memory unit 1210.

If the apparatus 1200 is part of a wireless device, the receive and transmit circuits 1206 and 1208 can be connected to a RF (Radio Frequency) circuit, but that is not shown in the drawing. The receive circuit 1206 processes and buffers received signals before sending the signals out to the data bus 1202. On the other hand, the transmit circuit 1208 processes and buffers the data from the data bus 1202 before sending the data out of the device 1200. If the apparatus 1200 is not part of a wireless device, the receive and transmit circuits 1206 and 1208 may be configured for receiving data from and sending data to other apparatuses (e.g., other hardware units 102) via wired connections. The CPU/controller 1204 performs the function of data management of the data bus 1202 and further the function of general data processing, including executing the instructional contents of the memory unit 1210.

Instead of separately disposed as shown in FIG. 12, as an alternative, the transmit circuit 1208 and the receive circuit 1206 can be parts of the CPU/controller 1204.

The memory unit 1210 includes a set of modules and/or instructions generally signified by the reference numeral 1212. In this embodiment, the modules/instructions 1212 include, among other things, a registration function 1234 for facilitating registration with the messaging system 108 by software components 106, a unicast communication function 1218 for facilitating unicast communication between registered software components 106, a multicast registration function 1220 for facilitating registration for multicast events by software components 106, a multicast communication function 1222 for facilitating multicast communication between registered software components 106, a discovery function 1224 for discovering new messaging clients 110*b* within the distributed computing system 100, a verification function 1226 for verifying that registered messaging clients 110*b* are operational, a synchronization function 1228 for maintaining synchronization among the registered messaging clients 110*b*, a cache management function 1230 for managing a resource location cache 1214, and a multicast management function 1232 for managing a multicast registration data structure 1216. The registration function 1234, the unicast communication function 1218, the multicast registration function 1220, the multicast communication function 1222, the discovery function 1224, the verification function 1226, the synchronization function 1228, the cache management function 1230, and the multicast management function 1232 include computer instructions or code for executing the process steps as shown and described in FIGS. 1-11.

Specific instructions particular to an entity can be selectively implemented. For example, if the apparatus 1200 provides the functionality of a messaging client 110b, then the registration function 1234, the unicast communication function 1218, the multicast registration function 1220, and the multicast communication function 1222 may be implemented. If the apparatus 1200 provides the functionality of a messaging server 110a, then all of the depicted functions may be implemented.

In addition, a resource location cache 1214 and a multicast registration data structure 1216 can also be included in the memory unit 1210. As an alternative, the resource location cache 1214 and the multicast registration data structure 1216 can be stored in one or more other memory units other than the unit 1210.

In this embodiment, the memory unit 1210 is a RAM (Random Access Memory) circuit. The exemplary functions (such as the registration function 1234, the unicast communication function 1218, the multicast registration function 1220, the multicast communication function 1222, the discovery function 1224, the verification function 1226, the synchronization function 1228, the cache management function 1230, and the multicast management function 1232) are software routines, modules and/or data sets. The memory unit 1210 can be tied to another memory circuit (not shown) which can either be of the volatile or nonvolatile type. As an alternative, the memory unit 1210 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art.

It should be further be noted that the inventive processes as described can also be coded as computer-readable instructions carried on any computer-readable medium known in the art. In this specification and the appended claims, the term "computer-readable medium" refers to any medium that participates in providing instructions to any processor, such as the CPU/controller 1204 shown and described in the drawing figure of FIG. 12, for execution. Such a medium can be of the storage type and may take the form of a volatile or nonvolatile storage medium as also described previously, for example, in the description of the memory unit 1210 in FIG. 12. Such a medium can also be of the transmission type and may include a coaxial cable, a copper wire, an optical cable, and the air interface carrying acoustic, electromagnetic or optical waves capable of carrying signals readable by machines or computers. The computer-readable medium can be part of a computer product separate from the apparatus 1200.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In addition to the above, the various other illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth, as described previously. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

Further, it should be appreciated that modules and/or other appropriate means for performing the methods and techniques described herein, such as those illustrated by FIGS. 7-8, can be downloaded and/or otherwise obtained by a mobile device and/or base station as applicable. For example, such a device can be coupled to a server to facilitate the transfer of means for performing the methods described herein.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An apparatus for inter-process communication, comprising:
a processor configured to control a message distribution entity, operating as a messaging interface as part of a multicast message distribution process that serves to hide at least some of the distributed nature of a system including multiple software components, said processor being configured to control the message distribution entity to:
receive, at the message distribution entity, a first message sent from a first software component, said first message corresponding to a multicast event and including a logical name of said multicast event;
determine, at the message distribution entity, by reference to a multicast registration data structure, which software components have registered for the multicast event, said determining identifying multiple software components that have registered for said multicast event, said multiple software components including at least a second software component and a third software component;
identify at the message distribution entity, from information included in the multicast registration data structure, physical addresses corresponding to the software components that are determined to have registered for said multicast event, said multicast registration data structure including information indicating physical addresses of software components which have registered for said multicast event identified by said logical name;

send messages, using said identified physical addresses, from the message distribution entity, to the software components that have registered for the multicast event, said messages communicating information obtained from said first message, sending messages communicating information obtained from said first message including sending a second message to said second software component and sending a third message to said third software component, said second and third messages including information obtained from said first message;

receive, at the message distribution entity, acknowledgement messages from the software components registered for the multicast event that received one of the messages sent from the message distribution entity communicating information obtained from said first message, receiving acknowledgement messages including receiving a first acknowledgement message from the second software component and receiving a second acknowledgment message from the third software component; and send, from the message distribution entity, a single acknowledgement message to the first software component after receiving acknowledgment messages from software components registered for the multicast event that received one of the messages sent from the message distribution entity communicating information obtained from said first message.

2. The apparatus of claim 1, wherein said processor is further configured to:

receive a registration message from a software component, said registration message including at least one of a physical address of the software component or a logical name of the software component;

determine the logical name for the software component, determine the physical address for the software component, and cause an entry associating the logical name for the software component and the physical address for the software component to be added to a resource location cache.

3. The apparatus of claim 1, wherein said processor is further configured to receive a multicast registration message corresponding to said multicast event from a software component registering for said multicast event, and create an entry in said multicast registration data structure, wherein the entry associates a physical address of the software component registering for said multicast event with said logical name for the multicast event.

4. A method performed by a message distribution entity operating as a messaging interface as part of a multicast message distribution process that serves to hide at least some of the distributed nature of a system including multiple software components, the method comprising:

receiving, a first message sent from a first software component, said first message corresponding to a multicast event and including a logical name of said multicast event;

determining, by reference to a multicast registration data structure, which software components have registered for the multicast event, said determining identifying multiple software components that have registered for said multicast event, said multiple software components including at least a second software component and a third software component;

identifying, from information included in the multicast registration data structure, physical addresses corresponding to the software components that are determined to have registered for said multicast event, said multicast registration data structure including information indicating physical addresses of software components which have registered for said multicast event identified by said logical name;

sending messages, using said identified physical addresses, to the software components that have registered for the multicast event, said messages communicating information obtained from said first message, sending messages communicating information obtained from said first message including sending a second message to said second software component and sending a third message to said third software component, said second and third messages including information obtained from said first message;

receiving acknowledgement messages from the software components registered for the multicast event that received one of the messages sent from the message distribution entity communicating information obtained from said first message, receiving acknowledgement messages including receiving a first acknowledgement message from the second software component and receiving a second acknowledgment message from the third software component; and sending a single acknowledgement message to the first software component after receiving acknowledgment messages from software components registered for the multicast event that received one of the messages sent from the message distribution entity communicating information obtained from said first message.

5. The method of claim 4, further comprising:

receiving a registration message from a software component, said registration message including at least one of a physical address of the software component or a logical name of the software component;

determining the logical name for the software component;

determining the physical address for the software component; and causing an entry associating the logical name for the software component and the physical address for the software component to be added to a resource location cache.

6. The method of claim 4, receiving a multicast registration message corresponding to said multicast event from a software component registering for said multicast event; and creating an entry in said multicast registration data structure, wherein the entry associates a physical address of the software component registering for said multicast event with said logical name for the multicast event.

7. A hardware unit comprising a message distribution entity operating as a messaging interface as part of a multicast message distribution process that serves to hide at least some of the distributed nature of a system including multiple software components, the message distribution entity comprising:

a multicast communication component that is configured to:

receive, a first message sent from a first software component, said first message corresponding to a multicast event and including a logical name of said multicast event;

determine, by reference to a multicast registration data structure, which software components have registered for the multicast event, said determining identifying multiple software components that have registered for said multicast event, said multiple software components including at least a second software component and a third software component;

identify, from information included in the multicast registration data structure, physical addresses corresponding to the software components that are determined to have registered for said multicast event, said multicast registration data structure including information indicating physical addresses of software components which have registered for said multicast event identified by said logical name;

send messages, using said identified physical addresses, to the software components that have registered for the multicast event, said messages communicating information obtained from said first message, sending messages communicating information obtained from said first message including sending a second message to said second software component and sending a third message to said third software component, said second and third messages including information obtained from said first message;

receive acknowledgement messages from the software components registered for the multicast event that received one of the messages sent from the message distribution entity communicating information obtained from said first message, receiving acknowledgement messages including receiving a first acknowledgement message from the second software component and receiving a second acknowledgment message from the third software component; and send a single acknowledgement message to the first software component after receiving acknowledgment messages from software components registered for the multicast event that received one of the messages sent from the message distribution entity communicating information obtained from said first message.

8. The hardware unit of claim 7, further comprising:
a registration component configured to:
  receive a registration message from a software component, said registration message including at least one of a physical address of the software component or a logical name of the software component;
  determine the logical name for the software component;
  determine the physical address for the software component; and
  cause an entry associating the logical name for the software component and the physical address for the software component to be added to a resource location cache.

9. The hardware unit of claim 7, further comprising a multicast registration component configured to:
  receive a multicast registration message corresponding to said multicast event from a software component registering for said multicast event; and
  create an entry in said multicast registration data structure, wherein the entry associates a physical address of the software component registering for said multicast event with said logical name for the multicast event.

10. An apparatus comprising a message distribution entity operating as a messaging interface as part of a multicast message distribution process that serves to hide at least some of the distributed nature of a system including multiple software components, the message distribution entity comprising:

means for receiving, a first message sent from a first software component, said first message corresponding to a multicast event and including a logical name of said multicast event;

means for determining, by reference to a multicast registration data structure, which software components have registered for the multicast event, said determining identifying multiple software components that have registered for said multicast event, said multiple software components including at least a second software component and a third software component;

means for identifying, from information included in the multicast registration data structure, physical addresses corresponding to the software components that are determined to have registered for said multicast event, said multicast registration data structure including information indicating physical addresses of software components which have registered for said multicast event identified by said logical name;

means for sending messages, using said identified physical addresses, to the software components that have registered for the multicast event, said messages communicating information obtained from said first message, said means for sending messages communicating information obtained from said first message further sends a second message to said second software component and sends a third message to said third software component, said second and third messages including information obtained from said first message, wherein said means for receiving is also for receiving acknowledgement messages from the software components registered for the multicast event that received one of the messages sent from the message distribution entity communicating information obtained from said first message, receiving acknowledgement messages including receiving a first acknowledgement message from the second software component and receiving a second acknowledgment message from the third software component; and wherein said means for sending is also for sending a single acknowledgement message to the first software component after said means for receiving receives acknowledgment messages from software components registered for the multicast event that received one of the messages sent from the message distribution entity communicating information obtained from said first message.

11. The apparatus of claim 10, wherein the means for receiving are also for receiving a registration message from a software component, said registration message including at least one of a physical address of the software component or a logical name of the software component, and wherein the messaging entity further comprises:
  means for determining the logical name for the software component and for determining the physical address for the software component; and
  means for creating an entry associating the logical name for the software component and the physical address for the software component in a resource location cache.

12. The apparatus of claim 10, wherein the means for receiving are also for receiving a multicast registration message corresponding to said multicast event from a software component registering for said multicast event; and
  wherein said messaging entity further comprises means for creating an entry in said multicast registration data structure, wherein the entry associates a physical address of the software component registering for said multicast event with said logical name for the multicast event.

13. A computer-program product for use in a message distribution entity operating as a messaging interface as part of a multicast message distribution process that serves to hide at least some of the distributed nature of a system including multiple software components, the computer-program product comprising a non-transitory computer readable medium having instructions thereon, the instructions comprising:

code which when executed by a processor, causes said processor to receive, a first message sent from a first software component, said first message corresponding to a multicast event and including a logical name of said multicast event;

code which when executed by the processor, causes said processor to determine, by reference to a multicast registration data structure, which software components have registered for the multicast event, said code causing said processor to identify, as part of determining, multiple software components that have registered for said multicast event, said multiple software components including at least a second software component and a third software component;

code which when executed by the processor, causes said processor to identify, from information included in the multicast registration data structure, physical addresses corresponding to the software components that are determined to have registered for said multicast event, said multicast registration data structure including information indicating physical addresses of components which have registered for said multicast event identified by said logical name;

code which when executed by the processor, causes said processor to send messages, using said identified physical addresses, from the message distribution entity to the software components that have registered for the multicast event, said messages communicating information obtained from said first message, said code causing said processor to further send a second message to said second software component and send a third message to said third software component, said second and third messages including information obtained from said first message;

code which when executed by the processor, causes said processor to receive acknowledgement messages from the software components registered for the multicast event that received one of the messages sent from the message distribution entity communicating information obtained from said first message, said code that causes said processor to receive acknowledgement messages including code which when executed by the processor causes said processor to receive a first acknowledgement message from the second software component and receiving a second acknowledgment message from the third software component; and code which when executed by the processor, causes said processor to send a single acknowledgement message to the first software component after receiving acknowledgment messages from software components registered for the multicast event that received one of the messages sent from the message distribution entity communicating information obtained from said first message.

14. The computer-program product of claim 13, wherein the non-transitory computer readable medium further comprises:

code which when executed by the processor, causes said processor to receive a registration message from a software component, said registration message including at least one of a physical address of the software component or a logical name of the software component;

code which when executed by the processor, causes said processor to determine the logical name for the software component;

code which when executed by the processor, causes said processor to determine the physical address for the software component; and code which when executed by the processor, causes said processor to add an entry associating the logical name for the software component and the physical address for the software component to a resource location cache.

15. The computer-program product of claim 13, wherein the non-transitory computer readable medium further comprises:

code which when executed by the processor, causes said processor to receive a multicast registration message corresponding to said multicast event from a software component registering for said multicast event; and code which when executed by the processor, causes said processor to create an entry in said multicast registration data structure; and wherein the entry associates a physical address of the software component registering for said multicast event with said logical name for the multicast event.

* * * * *